July 19, 1966 H. M. GORLIN 3,262,060
COMPLEMENTARY PUSH-PULL CAPACITIVE LOAD DRIVER
Filed Sept. 19, 1963
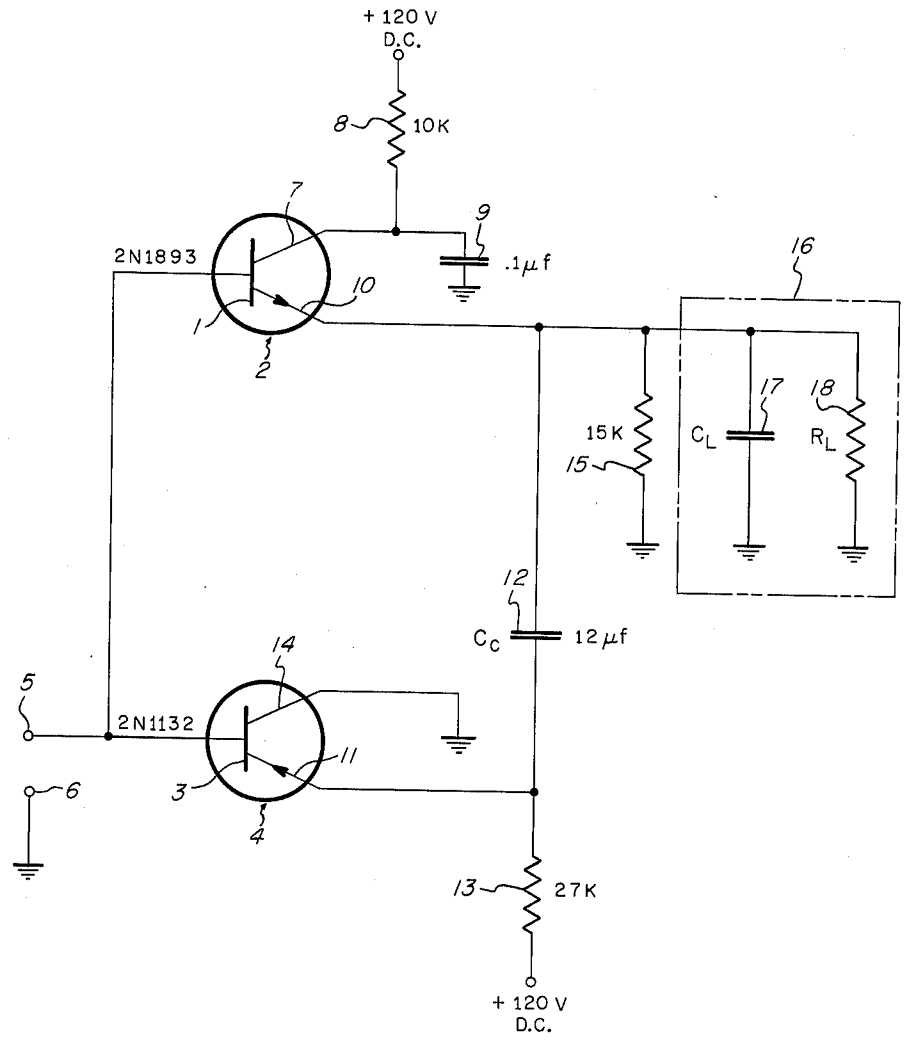
INVENTOR.
HOWARD M. GORLIN
BY Robert J. Haase
ATTORNEY United States Patent Office 3,262,060
Patented July 19, 1966

3,262,060
COMPLEMENTARY PUSH-PULL CAPACITIVE LOAD DRIVER
Howard M. Gorlin, Bayside, N.Y., assignor to Sperry Rand Corporation, Great Neck, N.Y., a corporation of Delaware
Filed Sept. 19, 1963, Ser. No. 309,958
4 Claims. (Cl. 330—13)

The present invention generally relates to circuits for driving loads characterized by high capacitance and, more particularly, to a complementary symmetry transistor circuit for driving capacitive loads.

Capacitive loads ordinarily present a troublesome design problem in applications where it is required that the load be quickly responsive to high frequency voltage changes of an input driving signal. For example, in computer applications where clock pulse sources usually drive a multiplicity of logical circuits, the distributed capacitance of the larger number of loads driven by the clock pulse source seriously lessens the ability of the loads to follow high frequency clock pulses. The consequence is a reduction in the ultimate speed at which computations can be performed.

Response times can be improved by providing sources capable of supplying large amounts of current of either polarity to the capacitive loads. Transistors and in particular emitter followers are recognized as having the required current supplying characteristic. Complementary symmetry techniques have been employed where it is desired to supply current of either polarity to a common load. The problem remains, however, as to how the aforementioned concepts can be put to effective use in a compact and reliable circuit for driving capacitive loads in response to input signals having extremely rapid amplitude changes such as the sharp leading and trailing edges of a short duration rectangular pulse.

It is the principal object of the present invention to provide a complementary symmetry transistor circuit characterized by simplicity and reliability for driving capacitive loads at high response rates.

Another object is to provide a complementary symmetry circuit producing fast response in capacitive loads to input signals having sharp leading and trailing edges.

A further object is to provide a complementary transistor circuit for linearly transmitting high frequency signals to a load having large capacitance.

These and other objects of the present invention, as will appear from the reading of the following specification, are achieved in a preferred embodiment by the provision of first and second transistors of opposite conductivity type connected in a complementary circuit configuration. The bases of the two transistors are connected together to receive an input signal. The emitter of the two transistors are coupled to each other by a capacitor whose capacitance is at least of the order of 10 times greater than the capacitance of the load to be driven. The load is directly connected to the emitter of one of the transistors. Means are provided for biasing both transistors for class A operation.

The complementary symmetry circuit faithfully preserves the leading and trailing edges of input rectangular pulses of short duration that might be applied to the interconnected transistor bases. Both small and large amplitude input signals are transmitted linearly to the capacitive load. Linearity is preserved by maintaining both transistors in conduction under the full range of amplitude variations. The capacitor which interconnects the emitters of the two transistors plays an important role in maintaining linear conduction of both transistors irrespective of the sense in which the input signal changes.

For a more complete understanding of the present invention, reference should be had to the following specification and to the sole figure which is a schematic diagram of a typical embodiment of the present invention.

Referring to the figure, base 1 of NPN transistor 2 and base 3 of PNP transistor 4 are connected together to receive an input signal which is aplied between terminals 5 and 6. Collector 7 of transistor 2 is connected to a source of positive potential via resistor 8. The junction between collector 7 and resistor 8 is coupled to ground by signal decoupling capacitor 9. Emitter 10 of transistor 2 is coupled to emitter 11 of transistor 4 via capacitor 12. The junction between emitter 11 and capacitor 12 is connected to a source of positive potential through resistor 13. Collector 14 of transistor 4 is directly connected to ground. Emitter 10 of transistor 2 is grounded through resistor 15. The load 16, driven by the complementary symmetry emitter follower circuit of the present invention, is generally represented by load capacitor 17 and load resistor 18. Typical operating values for the circuit parameters are shown in the figure.

The embodiment of the invention represented in the figure is adapted to receive input signals of positive polarity at terminals 5 and 6. These signals might be rectangular pulses of short duration having sharp rising and falling edges. By appropriate and straightforward adjustments in the levels of the transistor biasing potentials, the circuit may be conditioned to receive pulses of either or both polarities. The uni-polarity or bi-polarity of the input signals is of no consequence in the operation of the present invention. It is only necessary that the two transistors be biased for class A operation throughout the range of the input signals contemplated. Proper biasing is facilitated by the use of coupling condenser 12 between the emitters of transistors 2 and 4 which isolates the D.C. levels at the respective emitters.

In operation, when a positive-going signal is applied to terminal 5 relative to terminal 6, transistor 2 conducts more heavily and the conduction of transistor 4 decreases. The potential at emitter 10 closely follows the increasing potential at base 1. Inasmuch as the voltage across coupling capacitor 12 cannot change instantaneously, the increasing potential at emitter 10 of NPN transistor 2 is coupled to emitter 11 of PNP transistor 4. The application of the increasing potential to emitter 11 maintains transistor 4 in the linear range of conduction despite the application of the positive increasing signal at base 3. The preservation of linear conduction in transistor 4 maintains transistor 4 in a standby conduction condition so that it is immediately responsive to an opposite change in the input signal applied to terminals 5 and 6 that might favor conduction in transistor 4 and reduce conduction in transistor 2. If, on the other hand, transistor 4 were cut off by a positive-going input signal, an objectionable delay would be experienced in bringing transistor 4 out of cutoff and into conduction before load 16 could be driven by a negative-going signal.

The increasing current at emitter 10 in response to an increasing signal at terminals 5 and 6 quickly charges the capacitance of the load 16 represented by capacitor 17. Upon a reversal in the sense of the input signal, the potential at emitter 11 closely follows the negative-going signal at base 3 of transistor 4. Inasmuch as the capacitance of coupling capacitor 12 is much larger than the capacitance of the load 16, substantially all of the change in the potential of emitter 11 appears across load capacitor 17 rather than across coupling capacitor 12. This action enables the load to respond immediately to input signals which favor conduction in transistor 4 and lessen conduction in transistor 2.

Coupling capacitor 12 also maintains transistor 2 in a state of linear conduction during the interval of the signal swing favoring conduction in transistor 4 by lowering the potential of emitter 10 at the same time that the input signal potential is falling at base 1. The result is that transistor 2 is maintained in a linear standby condition so that it will be immediately responsive to an input signal change of opposite sense that would favor conduction in transistor 2 and reduce conduction in transistor 4.

In order that the coupling capacitor be maximally effective in maintaining transistor conduction, it is necessary that there be substantially no change in the net charge stored after each cycle of input signal. The achievement of a minimum potential across capacitor 12 results from making the capacitance of capacitor 12 very large relative to the capacitance of the load represented by capacitor 17. It has been found that a capacitance ratio of about 10 to one or more is satisfactory for input signal duty cycles of the order of 50% or less. Higher duty cycles, i.e., those which favor conduction in transistor 4 for a period longer than that during which conduction is favored in transistor 2, tend to develop a potential across capacitor 12. To the extent that a potential is developed across capacitor 12, conduction linearity is reduced in the transistor tending to be cut off by the input signal. Should a sufficient potential appear across capacitor 12, one of the transistors will be cut off with a commensurate reduction in the ability of the load 16 to follow fast changes in the input signal.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. A circuit comprising
first and second transistors of opposite conductivity type,
the bases of said transistors being directly connected together to receive an input signal,
means biasing said transistors into conduction,
means consisting solely of capacitive means coupling the emitters of said transistors to each other with respect to alternating input signal frequencies but isolating said emitters from each other with respect to bias levels,
and a capacitive load connected to the emitter of one of said transistors,
the capacitance of said capacitive means being at least 10 times greater than the capacitance of said load.

2. A circuit comprising
first and second transistors of opposite conductivity type,
the bases of said transistors being directly connected together to receive an input signal, means biasing both said transistors for class A operation,
means consisting solely of a capacitor coupling the emitters of said transistors to each other with respect to alternating input signal frequencies but isolating said emitters from each other with respect to bias levels,
and a capacitive load connected to the emitter of one of said transistors,
the capacitance of said capacitor being at least 10 times greater than the capacitance of said load.

3. A circuit comprising
a pair of transistors of opposite conductivity type,
the bases of said transistors being directly connected together to receive an input signal,
means biasing said transistors for class A operation,
means consisting solely of a capacitor connected between the emitters of said transistors coupling the emitters of said transistors to each other with respect to alternating input signal frequencies but isolating said emitters from each other with respect to bias levels,
and a capacitive load directly connected to the emitter of one of said transistors,
the capacitance of said capacitor being at least 10 times greater than the capacitance of said load.

4. A circuit comprising
a NPN transistor and a PNP transistor,
the bases of said transistors being directly connected together to receive an input signal,
means biasing said transistors for class A operation,
means consisting solely of a capacitor connected between the emitters of said transistors coupling the emitters of said transistors to each other with respect to alternating input signal frequencies but isolating said emitters from each other with respect to bias levels,
and a capacitive load directly connected to the emitter of said NPN transistor,
the capacitance of said capacitor being at least 10 times greater than the capacitance of said load.

References Cited by the Examiner

UNITED STATES PATENTS

| | | | |
|---|---|---|---|
| 2,762,870 | 9/1956 | Sziklai et al. | 330—17 |
| 2,860,193 | 11/1958 | Lindsay | 330—17 |
| 2,880,332 | 3/1959 | Wanlass. | |
| 3,160,767 | 12/1964 | Tindall. | |

ROY LAKE, *Primary Examiner.*

F. D. PARIS, *Assistant Examiner.*